United States Patent [19]

Spadafora

[11] Patent Number: 4,960,817
[45] Date of Patent: Oct. 2, 1990

[54] HIGH-TEMPERATURE, CORROSION-PREVENTIVE COATING

[75] Inventor: Stephen J. Spadafora, Willow Grove, Pa.

[73] Assignee: The United States of America as represented by the Secretary of the Navy, Washington, D.C.

[21] Appl. No.: 331,705

[22] Filed: Mar. 31, 1989

[51] Int. Cl.$^5$ .............................................. C08K 3/08
[52] U.S. Cl. ...................... 524/440; 524/441; 524/465; 524/474; 525/446
[58] Field of Search ............... 524/440, 441, 474, 465; 525/446

[56] References Cited

U.S. PATENT DOCUMENTS

| | | | |
|---|---|---|---|
| 2,743,192 | 4/1956 | White | 427/379 |
| 2,768,993 | 10/1956 | Drummond | 524/179 |
| 3,506,607 | 4/1970 | Bobear | 523/179 |
| 3,518,222 | 6/1970 | Ostrowski | 524/404 |
| 3,723,481 | 3/1973 | Bobear | 523/179 |
| 3,821,003 | 6/1974 | Dittrich et al. | 106/1.12 |
| 3,884,705 | 5/1975 | Blair | 106/1.17 |
| 4,157,991 | 6/1979 | Pilla | 524/68 |
| 4,507,421 | 3/1985 | Symietz | 524/425 |
| 4,518,726 | 5/1985 | Kato et al. | 524/32 |
| 4,657,963 | 4/1987 | Matsumoto et al. | 524/406 |
| 4,684,577 | 8/1987 | Coq | 428/447 |

*Primary Examiner*—Melvyn I. Marquis
*Attorney, Agent, or Firm*—James V. Tura; James B. Bechtel; Susan E. Verona

[57] ABSTRACT

A coating for metallic substrates is disclosed which provides corrosion protection thereto and is thermally stable at high temperatures. It comprises a binder formed from a blend of a silicone resin and a silicone alkyd co-polymer resin, a sacrificial anodic particle pigment such as zinc dust for providing chemical protection against corrosion, a leafing pigment such as leafing aluminum for providing barrier protection against corrosion, and solvents.

9 Claims, No Drawings

HIGH-TEMPERATURE, CORROSION-PREVENTIVE COATING

STATEMENT OF GOVERNMENT INTEREST

The invention described herein may be manufactured and used by or for the Government of the United States of America for governmental purposes without the payment of any royalties thereon and therefor.

BACKGROUND OF THE INVENTION

The present invention relates generally to coatings and more particularly to coatings which prevent corrosion and are thermally stable at high temperatures.

Many metal surfaces require the protection of a coating which will resist temepratures of 500° F. to 700° F. and also protect the metal surface against corrosion. An example of a surface requiring this kind of protection is the low carbon steel surface of the heat shields around aircraft turbine engines. In addition to being heat- and corrosion-resistant, the protective coating for such a surface should have good adhesion with minimal surface preparation and be easily appliable. Other desirable features of a coating of this type include the ability to air-dry within about eight hours to a coating with good film integrity, and the ability to partially cure at room temperature so as not to require immediate high temperature curing.

Currently used coatings for high-temperature applications lack one or more of these qualities. Ceramic coatings and those containing silicones with methyl and phenyl groups, require a high-temperature cure before use. Others, such as catalyzed silicones, require mechanical preparation of the substrate to achieve good adhesion. No single coating currently combines all of the above desirable characteristics.

SUMMARY OF THE INVENTION

Accordingly, it is a general object to provide a corrosion-preventive coating which is thermally stable at temperatures between 500° F. and 700° F.

It is another object to provide such a coating which air dries hard at ambient temperature within eight hours and exhibits good film properties.

It is yet another object to provide such a coating which is easily appliable and adheres well to the substrate with minimal surface preparation.

It is still another object to provide a coating which partially cures at room temperature and then completely cures upon first high temperature use, eliminating the need for a pre-use high-temperature cure.

It is also an object to provide a binder for use in a coating which renders the coating thermally stable at high-temperatures.

Briefly, these and other objects of the present invention are accomplished by a coating comprising a binder formed from a blend of silicone resin and a silicone alkyd co-polymer resin, a sacrificial anodic particle pigment such as zinc dust, a leafing pigment such as leafing aluminum, and organic solvents.

Other objects, advantages, and novel features of the present invention will become apparent from the following detailed description thereof.

DESCRIPTION OF THE PREFERRED EMBODIMENT

The present invention is a coating for application to metallic substrates which provides corrosion protection thereto and is thermally stable at temperatures ranging from 500° F. to 700° F. The coating is made up generally of a binder for providing good adhesive and film properties, and pigments for providing corrosion protection, as well as organic solvents for maintaining the coating in a liquid state until application and aiding in the drying rate of the coating.

The binder is a blend of two resins which provide high and ambient temperature coating properties as well as thermal stability. One resin is a silicone resin prepared from multifunctional organo-silanes, more particularly hydrolized organo chlorosilanes, with a trifunctional monomer content between about 35% and 55%. This resin provides the high-temperature binder properties as well as the thermal stability. The other resin, which provides the ambient temperature coating properties, is a silicone alkyd co-polymer resin having a minimum linseed oil content of 27%. This resin would also ideally have a phthalic anhydride content of 23%±5%, and a maximum acid number of 15. The binder itself may also be used as part of any coating to provide it with thermal stability at high temperatures. In this instance, the silicone resin should constitue 75% to 90% of the binder, the silicone alkyd co-polymer resin making up the remaining 10% to 25%.

The corrosion-protecting pigments in the coating are of two kinds. One is a sacrificial anodic particle pigment which provides chemical protection against corrosion. A preferred such particle pigment is zinc dust, preferably having an average particle size around 5 microns. The other corrosion-protecting pigment is a leafing pigment, the particles of which can overlap when applied to the substrate to form a physical barrier against corrosion. A preferred leafing pigment is leafing aluminum, which should optimally have an average particle size of around 25 microns and a leafing value greater than 50%.

The solvents may be any realtively non-polar solvents and should preferably have a solubility parameter of 8.8±0.7. Evaporation rates of the solvents used may be varied to affect the coating's drying rate. Typically, about half of the solvent content is provided with the other ingredients, which are more commonly available in solution form.

The Table below shows the formulation of the coating, with acceptable ranges for each ingredient shown in weight percent. The optimum formulation is also shown.

TABLE

| INGREDIENT | PREFERRED FORMULA (% by Weight) | FORMULA RANGE (% by Weight) |
|---|---|---|
| Silcone resin | 13.9 | 12.8–14.6 |
| Silicon alkyd co-polymer resin | 2.5 | 2.3–2.6 |
| Organic solvents | 39.8 | 34.6–46.3 |
| Zinc dust | 31.5 | 16.8–44.5 |
| Leafing aluminum | 12.3 | 5.8–19.7 |

Many of the ingredients shown in the Table are commonly provided in solution with organic solvents. For instance, the silicone resin and the silicone alkyd co-polymer resin may be added to the coating as 50% solids solutions, while the leafing aluminum may be in a 65% solids solution. The amount of solvent added is then adjusted accordingly.

A silicone resin of the desired trifunctional monomer content of between 35% and 55% may be achieved by proportionately mixing silicone resins having trifunctional monomer contents above and below the desired range.

Other ingredients may, of course, be added to provide various desirable features, such as metallic driers and antisettling agents. Additionally, the solvent content may be adjusted to affect viscosity if desired.

The coating is prepared by mixing all of the ingredients except for the leafing pigment in the desired proportions and milling them to a Hegman grind $\geq 1.5$ (ASTM D1210 procedure). The leafing pigment is then added and the whole mixture is mechanically stirred until it is homogeneous. The coating is applied by brushing, rolling, or spraying while it is still liquid to a preferrd thickness ranging from 0.001 to 0.002 inches. It will dry within eight hours and partially self-cure at room temperature, curing completely upon first high-temperature use.

In tests, the preferred formula of the coating provided corrosion protection to a carbon steel substrate for 500 hours in 5% salt spray. It also performed well when exposed to thermal cycling up to 700° F. for five days, and when exposed to hot lubricating oil and other aircraft operational chemicals. The coating exhibited good adhesion, measured according to ASTM standards, as well as good impact flexibility and pencil hardness, a measure of the coating's integrity.

Some of the advantages of the invention should now be readily apparent. For instance, a corrosion-preventive coating for metallic substrates has been provided which is thermally stable at temperatures up to 700° F. The coating exhibits good film properties, adheres well with minimal surface preparation, air-dries quickly, is easy to apply, and partially cures at room temperature.

Obviously, many modifications and variations of the present invention will be readily apparent to those of ordinary skill in the art in light of the above teachings. It is therefore to be understood that, within the scope of the appended claims, the invention may be practiced otherwise than as specifically described.

What is claimed is:

1. A corrosion-preventive coating which is thermally stable up to 700° F., comprising:
    a silicone resin prepared from multifunctional organo-silanes with a trifunctional monomer content between approximately 35% and 55%, for providing high-temperature binder properties;
    a silicone alkyd co-polymer resin with a minimum linseed oil content of 27% and a maximum acid number of 15, for providing ambient-temperature binder properties;
    organic solvent for maintaining the coating in a liquid state until application;
    a sacrificial anodic particle pigment for providing chemical protection against corrosion; and
    a leafing pigment for providing barrier protection against corrosion.

2. The coating of claim 1 wherein said sacrificial anodic particle pigment is zinc dust.

3. The coating of claim 2 wherein said zinc dust has an average particle size of about 5 microns.

4. The coating of claim 1 wherein said leafing pigment is leafing aluminum.

5. The coating of claim 4 wherein said leafing aluminum has an average particle size of about 25 microns.

6. A corrosion-preventive coating which is thermally stable up to 700° F., comprising:
    a silicone resin prepared from multifunctional organo-silanes with a trifunctional monomer content between approximately 35% and 55%, for providing high-temperature binder properties;
    a silicone alkyd co-polymer resin with a minimum linseed oil content of 27% and a maximum acid number of 15, for providing ambient-temperature binder properties;
    organic solvent for maintaining the coating in a liquid state until application;
    zinc dust for providing chemical protection against corrosion; and
    leafing aluminum for providing barrier protection against corrosion.

7. The coating of claim 6, wherein;
    said silicone resin constitutes about 12.8 to 14.6 weight percent of the coating;
    said silicone alkyd co-polymer resin constitutes about 2.3 to 2.6 weight percent of the coating;
    said organic solvent constitutes about 34.6 to 46.3 weight percent of the coating;
    said zinc dust has an average particle size of about 5 microns and constitutes about 16.8 to 44.5 weight percent of the coating; and
    said leafing aluminum has an average particle size of about 25 microns and constitutes about 5.8 to 19.7 weight percent of the coating.

8. The coating of claim 7, wherein:
    said silicone resin constitutes about 13.9 weight percent of the coating;
    said silicone alkyd co-polymer resin constitutes about 2.5 weight percent of the coating;
    said organic solvent constitutes about 39.8 weight percent of the coating;
    said zinc dust constitutes about 31.5 weight percent of the coating; and
    said leafing aluminum constitutes about 12.3 weight percent of the coating.

9. A binder for use in a coating which renders the coating thermally stable up to 700° F., comprising:
    a silicone resin prepared from multifunctional organo-silanes with a trifunctional monomer content between approximately 35% and 55%; and
    a silicone alkyd co-polymer resin with a minimum linseed oil content of 27% and a maximum acid number of 15.

* * * * *